US005499423A

United States Patent [19]

Joo et al.

[11] Patent Number: 5,499,423

[45] Date of Patent: Mar. 19, 1996

[54] NOISE CONTROL APPARATUS FOR VACUUM CLEANER

[75] Inventors: Jae-Man Joo, Seoul; Yong-Woo Kim, Suwon, both of Rep. of Korea

[73] Assignee: Samsung Electronics Co., Ltd., Suwon, Rep. of Korea

[21] Appl. No.: 246,143

[22] Filed: May 19, 1994

[30] Foreign Application Priority Data

May 19, 1993 [KR] Rep. of Korea ........................ 93-8571
Jul. 26, 1993 [KR] Rep. of Korea ........................ 93-14203

[51] Int. Cl.$^6$ .............................. A47L 9/28; G01H 3/00; G10K 11/16

[52] U.S. Cl. .............................. 15/319; 15/326; 381/71

[58] Field of Search .................... 15/319, 326; 181/231; 381/71; 415/119

[56] References Cited

U.S. PATENT DOCUMENTS

| | | | |
|---|---|---|---|
| 2,929,462 | 3/1960 | Nowak | 15/326 |
| 5,047,736 | 9/1991 | Ghose | 381/71 |
| 5,126,681 | 6/1992 | Ziegler, Jr. et al. | 381/71 |
| 5,295,192 | 3/1994 | Hamada et al. | 381/71 |
| 5,359,662 | 10/1994 | Yuan et al. | 381/71 |

FOREIGN PATENT DOCUMENTS

| | | | |
|---|---|---|---|
| 4189331 | 7/1992 | Japan | 15/326 |
| 0053841 | 1/1993 | Japan | 15/326 |

*Primary Examiner*—Stephen F. Gerrity
*Assistant Examiner*—Reginald L. Alexander
*Attorney, Agent, or Firm*—Burns, Doane, Swecker & Mathis

[57] ABSTRACT

A noise control apparatus for a vacuum cleaner, having a simple construction and capable of easy installation in the vacuum cleaner which effectively attenuates noise in a wide frequency band. The noise control apparatus includes a control unit, a noise detecting unit for detecting a noise generated from a noise source, generating a noise level signal on the basis of the noise detection, and sending the noise level signal to the control unit, a control sound generating unit for generating a control sound adapted to attenuate the noise from the noise source under a control of the control unit, and an error sound detecting unit for detecting an error sound resulting from the noise attenuation by the control sound from the control sound generating unit, generating an error sound signal on the basis of the error sound detection, and sending the error sound signal to the control unit. A low pass filter is coupled to each of the noise detecting units, the error sound detecting unit and the control sound generating unit. By the provision of such a low pass filter, it is possible to greatly attenuate noise having a frequency of 500 Hz or below.

20 Claims, 10 Drawing Sheets

FIG. 8
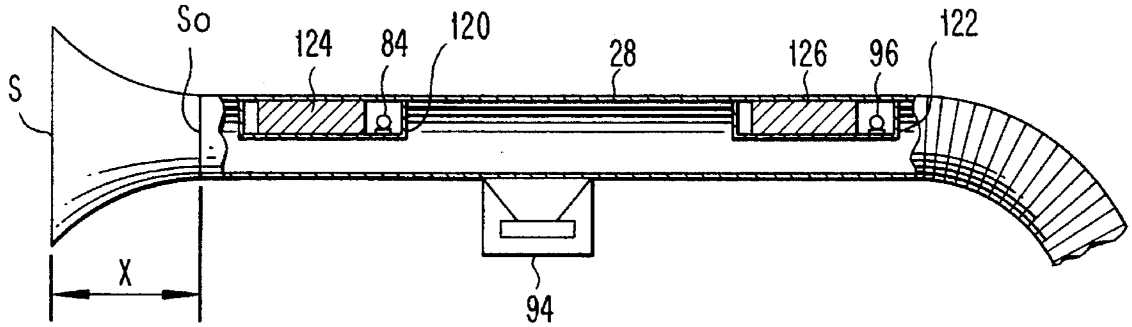
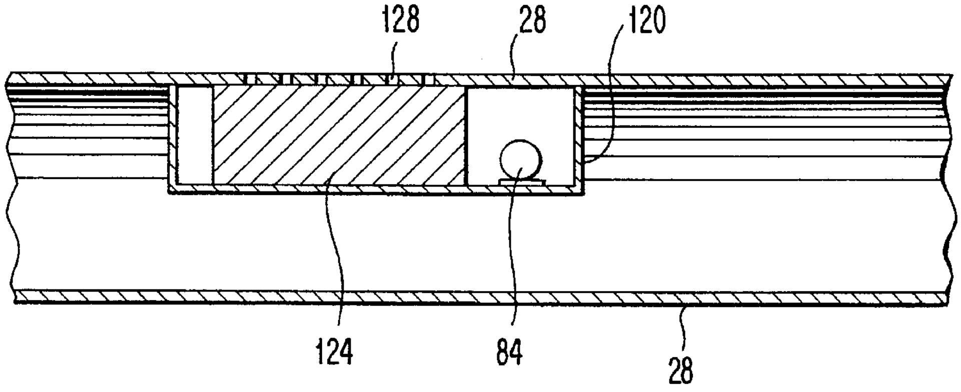
FIG. 9

NOISE CONTROL APPARATUS FOR VACUUM CLEANER

BACKGROUND OF THE INVENTION

1. Field of the Invention

The present invention relates to a noise control apparatus for a vacuum cleaner, and more particularly to a noise control apparatus for a vacuum cleaner capable of positively controlling noise generated from a dust-sucking motor and an impeller.

2. Description of the Prior Art

Generally, noise generated in vacuum cleaners may be present in a wide frequency band. For removing such noise, various proposals has been made. For example, there have been proposed an installation of a sound-absorbing member surrounding both an impeller and a motor disposed in a vacuum cleaner, as disclosed in Japanese Patent Laid-open Publication No. Sho 62-32903, as well as a provision for an elongated fluid passage (air passage) in a vacuum cleaner.

Although these noise control methods exhibit superior effects for removing noise having a frequency band of 500 Hz or above, they encounter problems in removing noise of a lower frequency band. For removing such lower frequency noise, a sound-absorbing member having an increased thickness should be used. Due to such an increase in thickness, however installation of the sound-absorbing member in the interior of vacuum cleaner may be difficult.

SUMMARY OF THE INVENTION

It is therefore an object of the present invention to solve the above-mentioned problem encountered in the prior art, and thus to provide a noise control apparatus for a vacuum cleaner capable of positively controlling noise generated from a dust-sucking motor, to achieve a simple installation thereof, and to effectively remove noise having a frequency of 500 Hz or below.

In accordance with the present invention, this object can be accomplished by providing a noise control apparatus for a vacuum cleaner comprising: control means; noise detecting means for detecting a noise generated from a noise source, generating a noise level signal on the basis of the noise detection, and sending the noise level signal to the control means; control sound generating means for generating a control sound adapted to attenuate the noise from the noise source under control of the control means; and error sound detecting means for detecting an error sound resulting from the noise attenuation by the control sound from the control sound generating means, generating an error sound signal on the basis of the error sound detection, and sending the error sound signal to the control means.

BRIEF DESCRIPTION OF THE DRAWINGS

These and other objects, features and advantages of the invention will become more apparent from the following description of embodiments with reference to the accompanying drawings, in which:

FIG. 8 is a sectional view of a suction pipe equipped in the vacuum cleaner shown in FIG. 7A; and FIG. 9 is an enlarged view of a part of the suction pipe shown in FIG. 8.

DETAILED DESCRIPTION OF THE PREFERRED EMBODIMENTS

Figure 1:
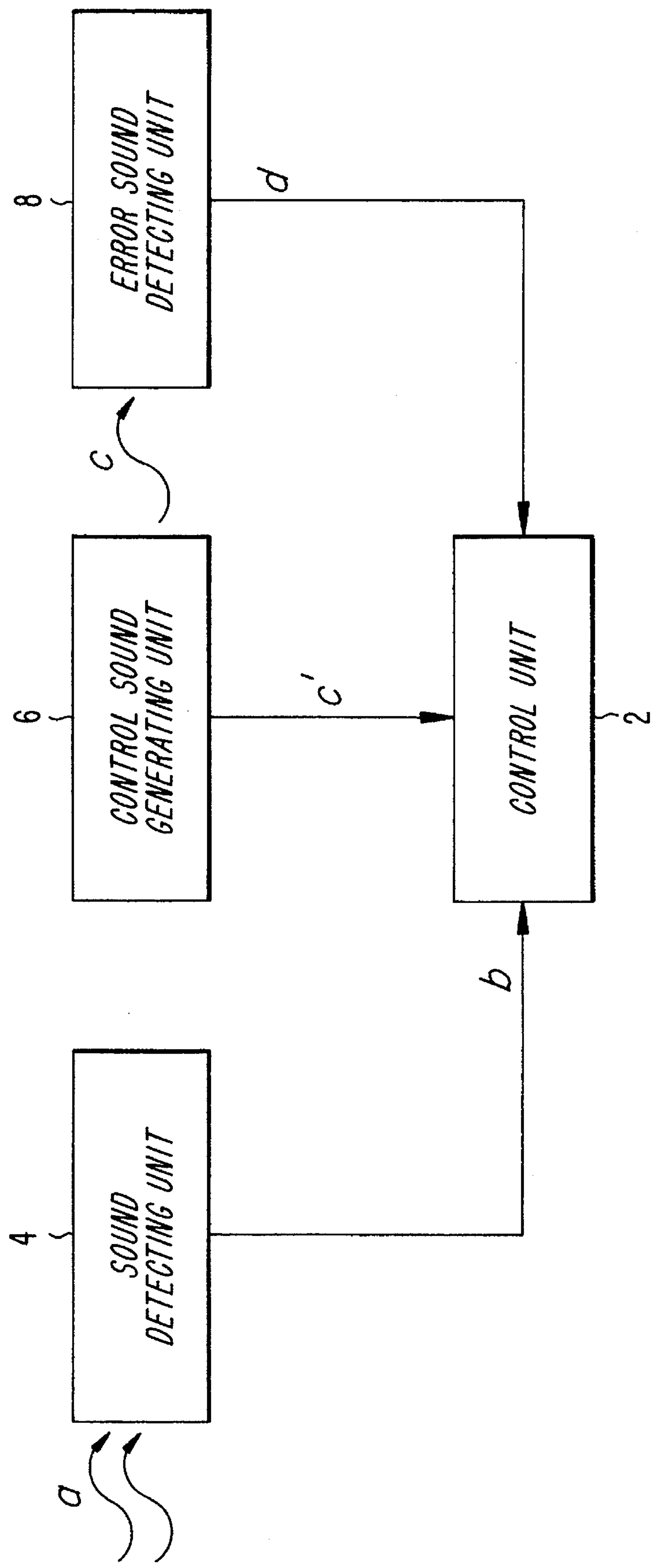
FIG. 1 is a block diagram of a noise control apparatus for a vacuum cleaner in accordance with a first embodiment of the present invention.

FIG. 1 is a block diagram of a noise control apparatus for a vacuum cleaner in accordance with a first embodiment of the present invention.

As shown in FIG. 1, the noise control apparatus comprises a control unit 2 and a noise detecting unit 4 for detecting noise generated from a noise source, which will be described hereinafter. The noise detecting unit 4 generates a noise level signal on the basis of the detection and sends it to the control unit 2. A control sound generating unit 6 is also provided which receives a control signal from the control unit 2 and thereby generates a control sound for attenuating the noise generated from the noise source. The noise control apparatus further comprises an error sound detecting unit 8 for detecting an error sound indicative of the result of the attenuation of the noise from the noise source by the control sound from the control sound generating unit 6. The error sound detecting unit 8 generates an error sound signal on the basis of the detection and sends it to the control unit 2.

Figure 2:
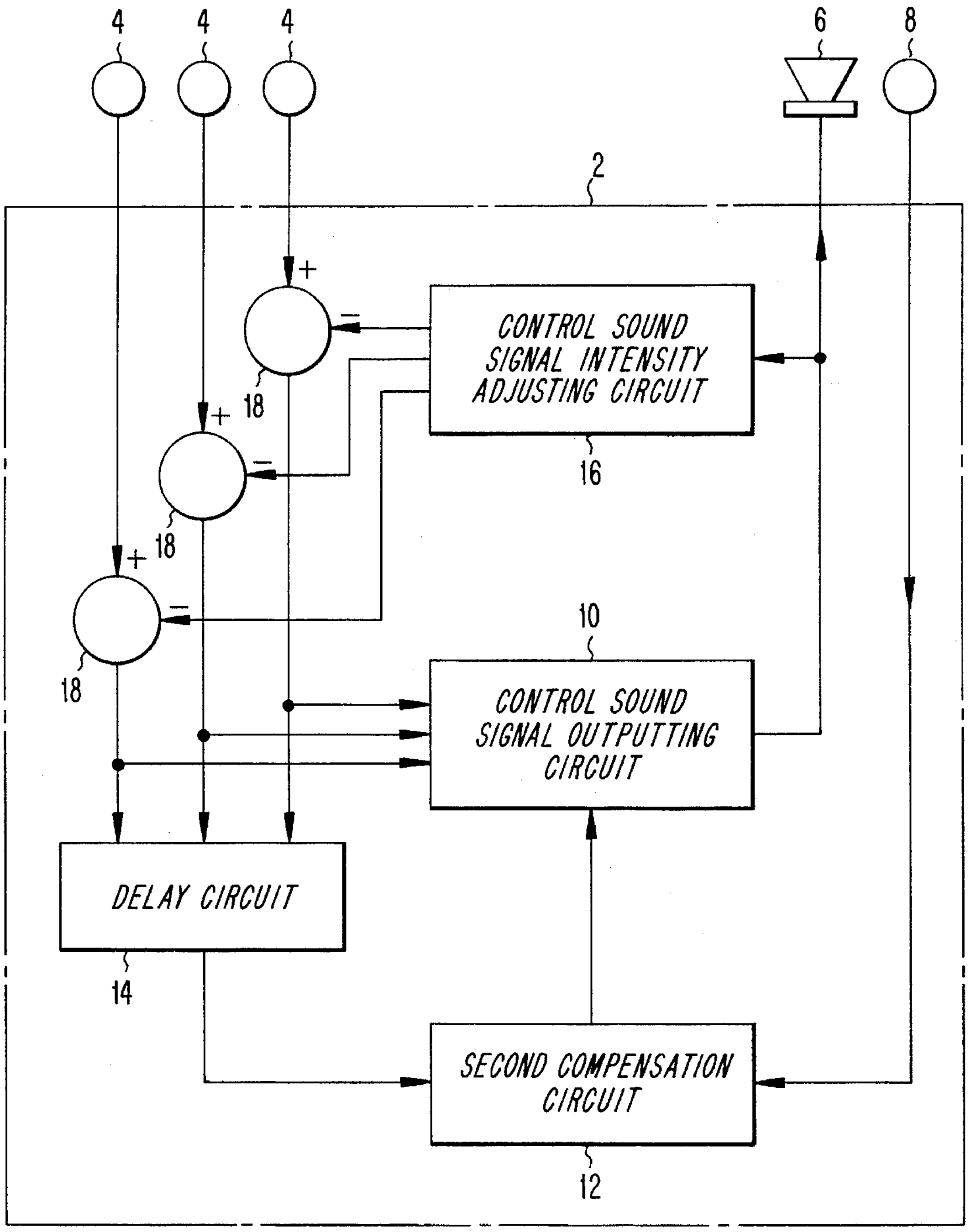
FIG. 2 is a block diagram of a control unit shown in FIG. 1.

The control unit 2 is a microprocessor for controlling the overall operations of the noise control apparatus. As shown in FIG. 2, the control unit 2 comprises a control sound signal outputting circuit 10 adapted to receive the noise signal from the noise detecting unit 4 and to generate a control sound signal having the same amplitude and intensity as those of the noise signal and the opposite phase as that of the noise signal. The control sound signal from the control sound signal outputting circuit 10 is transmitted to the control sound generating unit 6. The control unit 2 further comprises a pair of compensation circuits, the first one denoted by the reference numeral 18 and the second one denoted by the reference numeral 12. The second compensation circuit 12 serves to generate a compensation signal for minimizing the intensity of the error sound. For generating such a compensation signal, the second compensation circuit 12 performs an operation based on the error sound signal generated from the error sound detecting unit 8 and the noise signal detected by the noise detecting unit 4. The compensation signal from the second compensation circuit 12 is sent to the control sound signal outputting circuit 10. A delay circuit 14 is coupled between the noise detecting unit 4 and the second compensation circuit 12. The delay circuit 14 delays the noise signal output from the noise detecting unit 4 for a predetermined time so as to synchronize the noise generated from the noise source and the control sound generated from the control sound generating unit 6 at the site of the error sound detecting unit 8. The delayed noise signal from the delay circuit 14 is sent to the second compensation circuit 12. The control unit 2 further comprises a control sound signal intensity adjusting circuit 16 adapted to receive the control sound signal from the control sound signal outputting circuit 10 and adjust the intensity of the received signal. The first compensation circuit 18 serves to transmit only the noise generated from the noise source to the control sound signal outputting circuit 10 and the delay circuit 14. To this end, the first compensation circuit 18 subtracts the control sound signal generated from the control sound signal outputting circuit 10 as adjusted in intensity by the intensity adjusting circuit 16 from the noise signal detected by the noise detecting unit 4. The noise signal compensated on the basis of the subtraction is sent to both the control sound signal outputting circuit 10 and the delay circuit 14.

The second compensation circuit 12 is constructed to perform an operation for generating the compensation signal in accordance with a least mean square algorithm.

Figure 3:
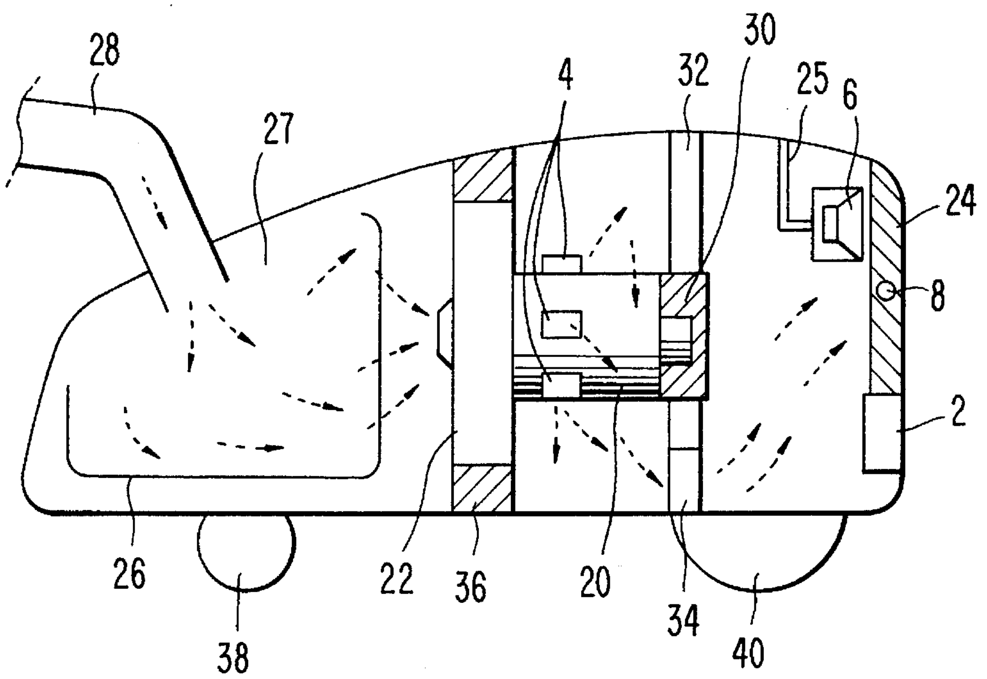
FIG. 3 is a sectional view of the vacuum cleaner shown in FIG. 1, showing the arrangement of the noise control apparatus in the vacuum cleaner.

As shown in FIG. 3, the noise detecting unit 4 is a microphone attached to the outer surface of a housing of a dust-sucking motor 20 and is adapted to detect noise generated from the dust-sucking motor 20 and an impeller 22 driven by the dust-sucking motor 20.

In a first embodiment of the present invention, the motor 20 and the impeller 22 together constitute the noise source.

The control sound generating unit is a speaker disposed in the vicinity of an air filter 24 at the rear portion of the vacuum cleaner and is attached to a body 32 of the vacuum cleaner by means of a fixture 25 such that it faces outwardly from the vacuum cleaner. The speaker serves to attenuate the noise generated from the motor 20 and the impeller 22 so as to prevent the noise from being transmitted outwardly from the vacuum cleaner.

The error sound detecting unit 8 is a microphone disposed in the interior of the air filter 24 and adapted to detect an error sound resulting from the attenuation of the noise generated from the dust-sucking motor 20 and the impeller 22 by the control sound generated from the control sound generating unit 6.

As shown in FIG. 3, a removable dust collecting pack 26 is disposed on one side of the motor 20 and the impeller 22. The dust collecting pack 26 resides in a dust collecting chamber 27, to which a suction pipe 28 is connected.

A first damper 30 is disposed at the rear portion of motor 20 and is coupled to the cleaner body 32 so as to attenuate vibration generated from the motor 20 and transmitted to the cleaner body 32. Beneath the damper 30 a fluid passage 34 is defined in the interior of the cleaner body 32. The fluid passage 34 serves to guide air sucked into the dust collecting chamber 27 through the suction pipe 28 to the air filter 24 via the impeller 22, as indicated by the dotted arrows in FIG. 3.

A second damper 36 is disposed at the outer surface of a bracket for fixedly mounting the impeller 22 so as to attenuate vibration generated from the impeller 22.

The control unit 2 is disposed beneath the air filter 24. Wheels 38 and 40 are rotatably mounted to the bottom portion of the cleaner body 32 so as to enable travel of the cleaner body 32.

Operation of the noise control apparatus for the vacuum cleaner in accordance with the first embodiment of the present invention will now be described.

When a user plugs in the vacuum cleaner, a voltage of 20 volts AC is applied to DC voltage supply source means (not shown) equipped in the cleaner body 32. As a result, a voltage of 5 volts DC is generated from the DC voltage supply source means and applied to the control unit 2. The DC voltage supply source means also generates a voltage of 12 volts DC which is, in turn, applied to the noise detecting unit 4, the error sound detecting unit 8 and the control sound generating unit 6. Accordingly, the control unit 2, the noise detecting unit 4, the control sound generating unit 6 and the error sound detecting unit 8 can operate.

Figure 4A:
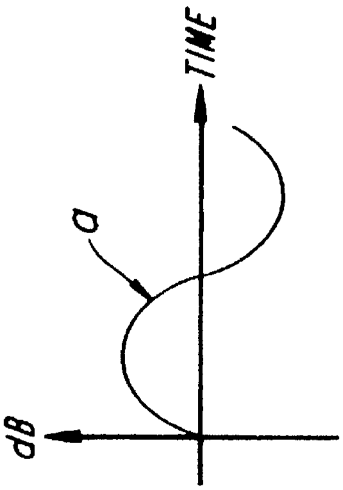
FIGS. 4A to 4D are diagrams respectively illustrating waveforms of various parts of the noise control apparatus shown in FIG. 1.

When the user switches on a drive switch (not shown) to operate the vacuum cleaner, the motor 20 is driven, thereby causing the impeller 22 to rotate. As the motor 20 and the impeller 22 rotate, a noise a having characteristics shown in FIG. 4A is generated from both the motor 20 and the impeller 22. The noise a is then detected by the noise detecting unit 4 which, in turn, generates a noise signal b having characteristics indicated by the solid line in FIG. 4B. The noise signal b from the noise detecting unit 4 is sent to the first compensation circuit 18 of the control unit 2.

At this time, the control sound signal intensity adjusting circuit 16 does not apply any control sound signal to the first compensation circuit 18. As a result, the first compensation circuit 18 sends the noise signal b, as is, to both the control sound signal outputting circuit 10 and the delay circuit 14.

Figure 4B:
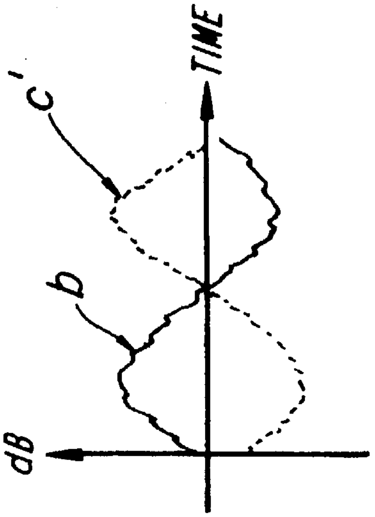

Based on the received noise signal b, the control sound signal outputting circuit 10 generates a control sound signal c' having the same amplitude and intensity as those of the noise signal b and the opposite phase as that of the noise signal b, as indicated by the dotted line in FIG. 4B. The control sound signal c' from the control sound signal outputting circuit 10 is then sent to both the control sound generating unit 6 and the intensity adjusting circuit 16.

Figure 4C:
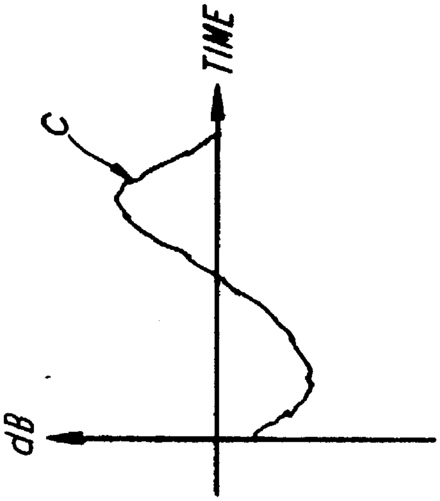

Based on the control sound signal c', the control sound generating unit 6 generates a control sound c having the same intensity and frequency as those of the noise signal b and the opposite phase as that of the noise a generated from both the motor 20 and the impeller 22, as shown in FIG. 4C.

Figure 4D:
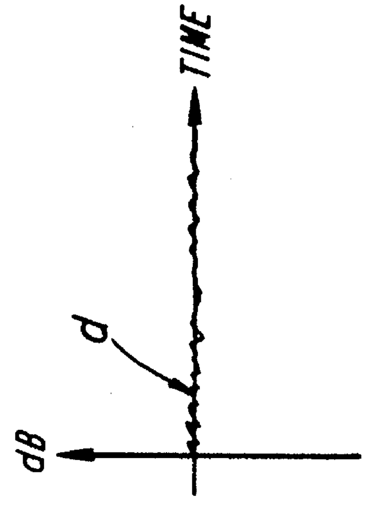

The noise generated from the motor 20 and the impeller 22 is then attenuated by the control sound generated from the control sound generating unit 6. As a result, only an error sound d having a characteristic shown in FIG. 4D is left in the cleaner body 32.

This error sound d is detected by the error sound detecting unit 8 which, in turn, generates an error sound signal and sends it to the second compensation circuit 12 of the control unit 2.

Upon receiving the noise signal b indicated by the solid line in FIG. 4B from the first compensation circuit 18, the delay circuit 14 delays the noise signal b for a predetermined time so as to synchronize the noise transmitted from the motor 20 and the impeller 22 with the control sound output from the control sound generating unit 6 at the site of the error sound detecting unit 8. After the delay, the delay circuit 14 sends the noise signal to the second compensation circuit 12.

The second compensation circuit 12 then performs an operation to generate a compensation signal for minimizing the intensity of the error signal in accordance with a least mean square algorithm, based on the error sound signal generated from the error sound detecting unit 8 and the noise signal detected by the noise detecting unit 4. The compensation signal from the second compensation circuit 12 is then applied to the control sound signal outputting circuit 10.

Thereafter, the control sound signal outputting circuit 10 generates a control sound signal corrected on the basis of the compensation signal and applies it to both the control sound generating unit 6 and the control sound signal intensity adjusting circuit 16.

Based on the corrected control sound signal, the control sound generating unit 6 generates a corrected control sound which is applied to the interior of cleaner body 32.

As a result, the error sound left in the cleaner body 32 is removed by the corrected control sound generated from the control sound generating unit 6, and the vacuum cleaner can be operated under comfortable conditions.

Upon receiving the control sound signal from the control sound signal outputting circuit 10, the intensity adjusting circuit 16 adjusts the control sound signal in intensity. The intensity-adjusted control sound signal from the intensity adjusting circuit 16 is then sent to the first compensation circuit 18.

The first compensation circuit 18 subtracts the control sound signal generated from the control sound signal outputting circuit 10 as adjusted in intensity by the intensity adjusting circuit 16 from the noise signal detected by the noise detecting unit 4. By this subtraction, only the noise signal having the intensity equivalent to the noise generated from the motor 20 and impeller 22 is sent to the control sound signal outputting circuit 10 and the delay circuit 14.

As the user moves the cleaner body 32 along a floor to be cleaned, dust on the floor is sucked with air into the dust collecting chamber 27 via the suction pipe 28. The air is filtered in the dust collecting chamber 27 so that the dust will be collected in the dust collecting chamber 27. The filtered air passes through the impeller 22, the fluid passage 34 and the air filter 24, in this order, to be vented out of the cleaner body 32. During this process, the above-mentioned noise control operation is continually performed. Accordingly, the vacuum cleaner can always be operated under comfortable conditions.

Figure 5A:
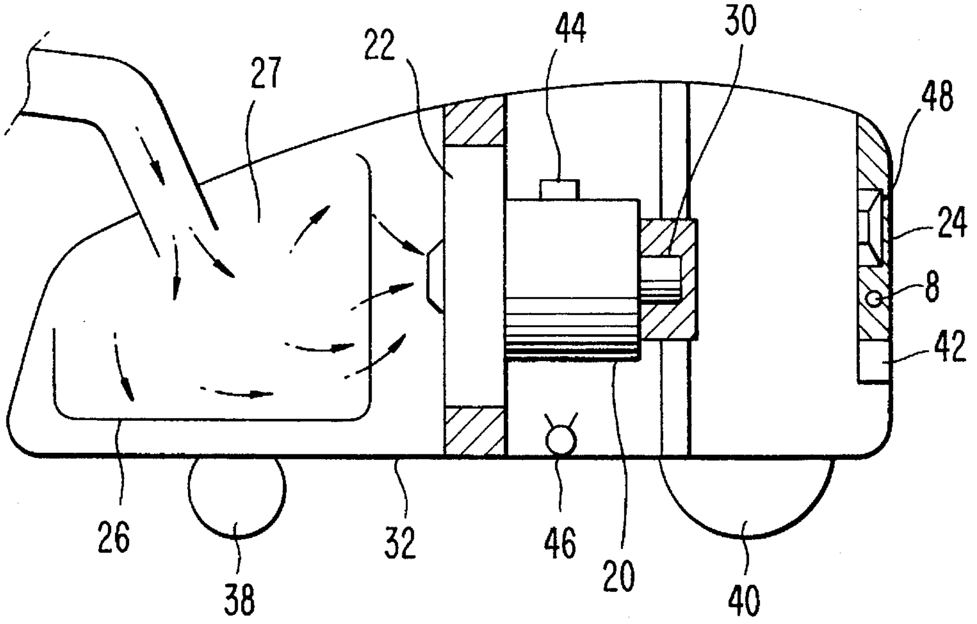
FIG. 5A is a sectional view of a noise control apparatus for a vacuum cleaner in accordance with a second embodiment of the present invention.
Figure 5B:
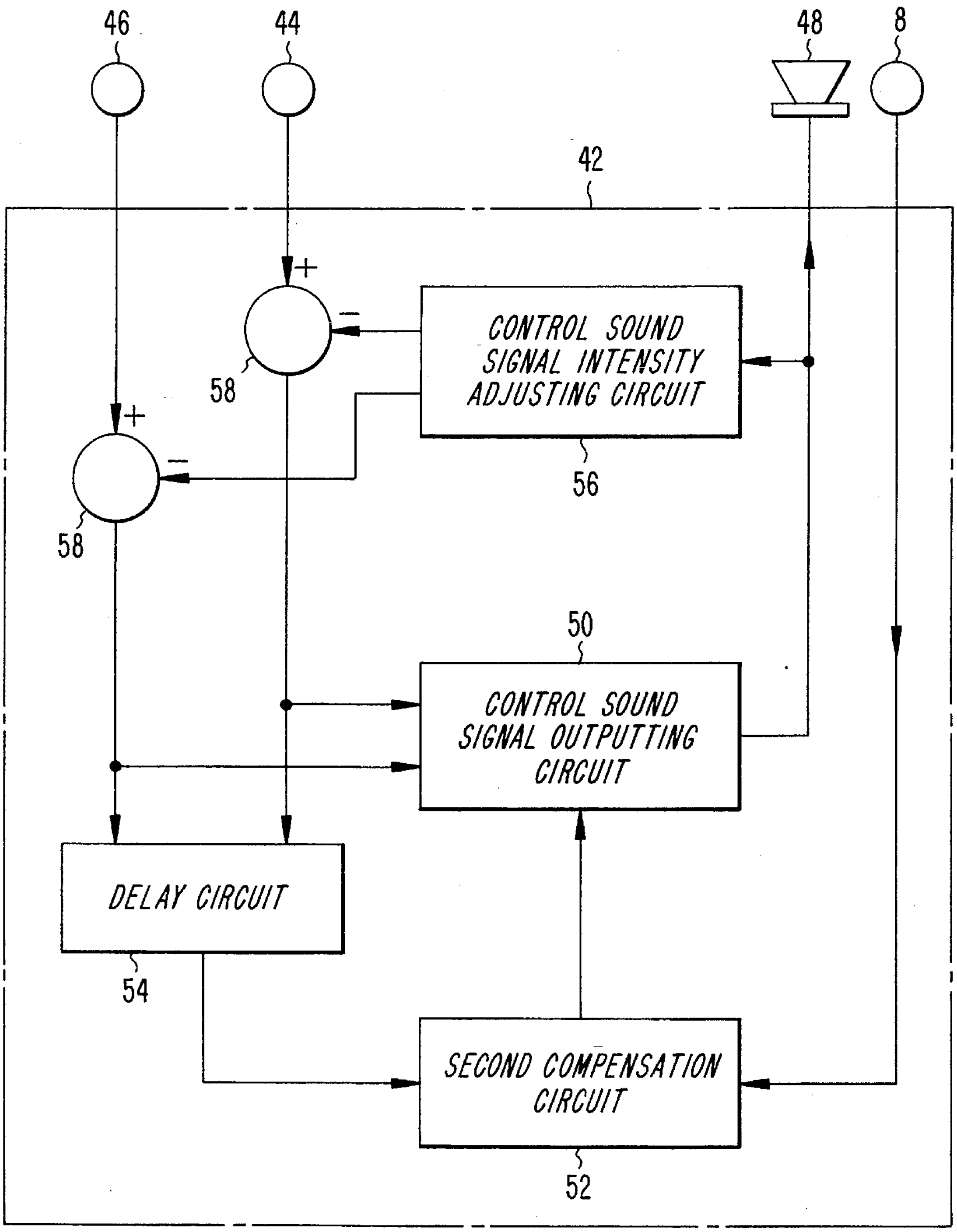
FIG. 5B is a block diagram of a control unit shown in FIG. 5A.

FIGS. 5A and 5B illustrate a noise control apparatus for a vacuum cleaner in accordance with a second embodiment of the present invention.

In FIGS. 5A and 5B, elements corresponding to those in FIGS. 1 to 4 illustrating the first embodiment of the present invention are denoted by the same reference numerals, and thus their description will be omitted.

In accordance with the second embodiment, the noise detecting unit adapted to detect noise generated from the motor 20 and the impeller 22 and to generate a noise level signal on the basis of the detection comprises a first noise detecting unit 44 and a second noise detecting unit 46. The first noise detecting unit 44 is attached to the outer surface of the housing of motor 20, whereas the second noise detecting unit 46 is attached to the bottom surface of cleaner body 32 such that it is spaced apart from both the motor 20 and the impeller 22.

As with the noise control apparatus described in the first embodiment, the noise control apparatus of the second embodiment includes a control unit 42 which is a microprocessor for controlling the overall operations of the noise control apparatus. As shown in FIG. 5B, the control unit 42 comprises a control sound signal outputting circuit 50 adapted to receive noise signals from the first and second noise detecting units 44 and 46, to derive an average of the received noise signals, to generate a control sound signal having the same amplitude and intensity as those of the average noise signal and the opposite phase as that of the average noise signal. The control sound signal from the control sound signal outputting circuit 50 is transmitted to a control sound generating unit 48 which is identical to the control sound generating unit 6 of the first embodiment. The control unit 42 further comprises a pair of compensation circuits, the first one denoted by the reference numeral 58 and the second one denoted by the reference numeral 52. The second compensation circuit 52 generates a compensation signal for minimizing the intensity of the error sound. For generating such a compensation signal, the second compensation circuit 52 performs an operation, based on the error sound signal generated by the error sound detecting unit 8 and the noise signals detected by the first and second noise detecting units 44 and 46. The compensation signal from the second compensation circuit 52 is sent to the control sound signal outputting circuit 50.

A delay circuit 54 is also provided for delaying the noise signals output from the first and second noise detecting units 44 and 46 for a predetermined time so as to synchronize the noise generated from the noise source and the control sound generated from the control sound generating unit 48 at the site of the error sound detecting unit 8. The delayed noise signal from the delay circuit 54 is sent to the second compensation circuit 52.

The control unit 42 further comprises a control sound signal intensity adjusting circuit 56 adapted to receive the control sound signal from the control sound signal outputting circuit 50 and to adjust the intensity of the received signal. The first compensation circuit 58 serves to transmit only the noise generated from the noise source to the control sound signal outputting circuit 50 and the delay circuit 54. To this end, the first compensation circuit 58 subtracts the control sound signal generated from the control sound signal outputting circuit 50 as adjusted in intensity by the intensity adjusting circuit 56 from each of the noise signals detected by the first and second noise detecting unit 44 and 46. The noise signal, compensated on the basis of the subtraction, is sent to both the control sound signal outputting circuit 50 and the delay circuit 54.

The operation and functional effect of the noise control apparatus of the second embodiment are similar to those of the first embodiment, and thus their description will be omitted.

Figure 6A:
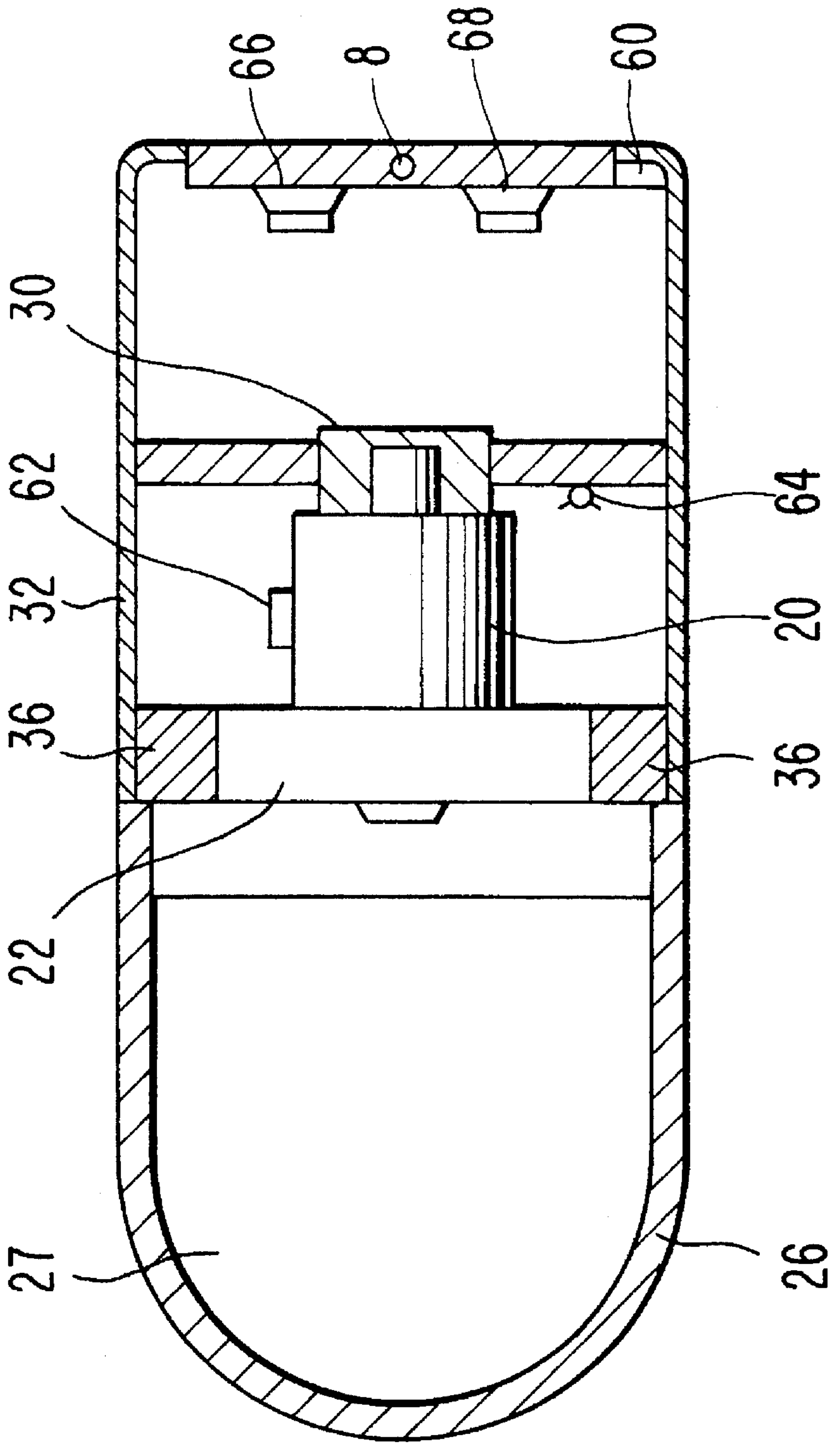
FIG. 6A is a sectional view of a noise control apparatus for a vacuum cleaner in accordance with a third embodiment of the present invention.
Figure 6B:
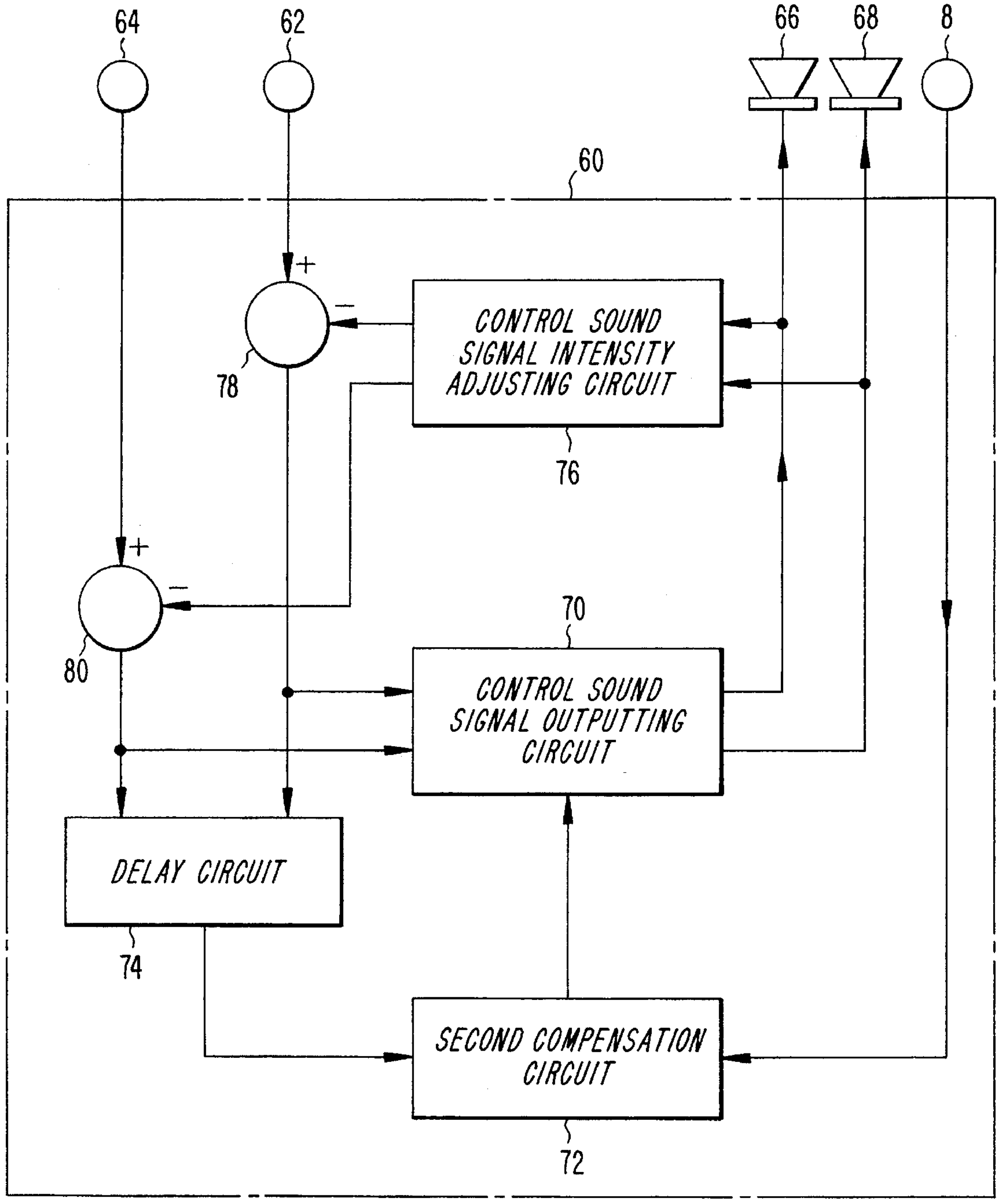
FIG. 6B is a block diagram of a control unit shown in FIG. 6A.

FIGS. 6A and 6B illustrate a noise control apparatus for a vacuum cleaner in accordance with a third embodiment of the present invention.

In FIGS. 6A and 6B, elements corresponding to those in FIGS. 1 to 4 illustrating the first embodiment of the present invention are denoted by the same reference numerals, and thus their description will be omitted.

In accordance with the third embodiment, the noise detecting unit which is adapted to detect noise generated from the motor 20 and the impeller 22 and to generate a noise level signal on the basis of the detection comprises a first noise detecting unit 62 and a second noise detecting unit 64. The first noise detecting unit 62 is attached to the outer surface of the housing of motor 20 whereas the second noise detecting unit 64 is attached to the bottom surface of cleaner body 32 such that it is spaced apart from both the motor 20 and the impeller 22.

As with the noise control apparatus of the first embodiment, the noise control apparatus of the third embodiment includes a control unit 60 which is a microprocessor for controlling the overall operations of the noise control apparatus. As shown in FIG. 6B, the control unit 60 comprises a control sound signal outputting circuit 70 adapted to receive noise signals from the first and second noise detecting units 62 and 64, derive an average of the received noise signals, generate a control sound signal having the same amplitude and intensity as those of the average noise signal and the opposite phase as that of the average noise signal. The control sound signal from the control sound signal outputting circuit 70 is transmitted to a first control sound generating unit 66 and a second control sound generating unit 68, each of which has a construction identical to that of the control sound generating unit 6 of the first embodiment. The control unit 60 further comprises a pair of first compensation circuits 78 and 80 and a second compensation circuit 72. The second compensation circuit 72 serves to generate a compensation signal for minimizing the intensity of the error sound. For generating such a compensation signal, the second compensation circuit 72 performs an operation based on the error sound signal generated from the error sound detecting unit 8 and the noise signals detected by the first and second noise detecting units 62 and 64. The compensation signal from the second compensation circuit 72 is sent to the control sound signal outputting circuit 70.

A delay circuit 74 is also provided for delaying the noise signals respectively output from the first and second noise detecting units 62 and 64 for a predetermined time so as to synchronize the noise generated from the noise source with the control sounds generated from the first and second control sound generating unit 66 and 68 at the site of the error sound detecting unit 8. The delayed noise signal from the delay circuit 74 is sent to the second compensation circuit 72.

The control unit 60 further comprises a control sound signal intensity adjusting circuit 76 receives the control sound signal from the control sound signal outputting circuit 70 and adjusts the intensity of the received signal. The first compensation circuits 78 and 80 transmit only the noise generated from the noise source to the control sound signal outputting circuit 70 and the delay circuit 74. To this end, the first compensation circuits 78 and 80 subtract the control sound signal generated from the control sound signal outputting circuit 70 as adjusted in intensity by the intensity adjusting circuit 76 from noise signals detected by the first and second noise detecting units 62 and 64. Each noise signal compensated on the basis of the subtraction is sent to both the control sound signal outputting circuit 70 and the delay circuit 74.

The operation and functional effect of the noise control apparatus of the third embodiment are similar to those of the first embodiment, and thus their description will be omitted.

Figure 7A:
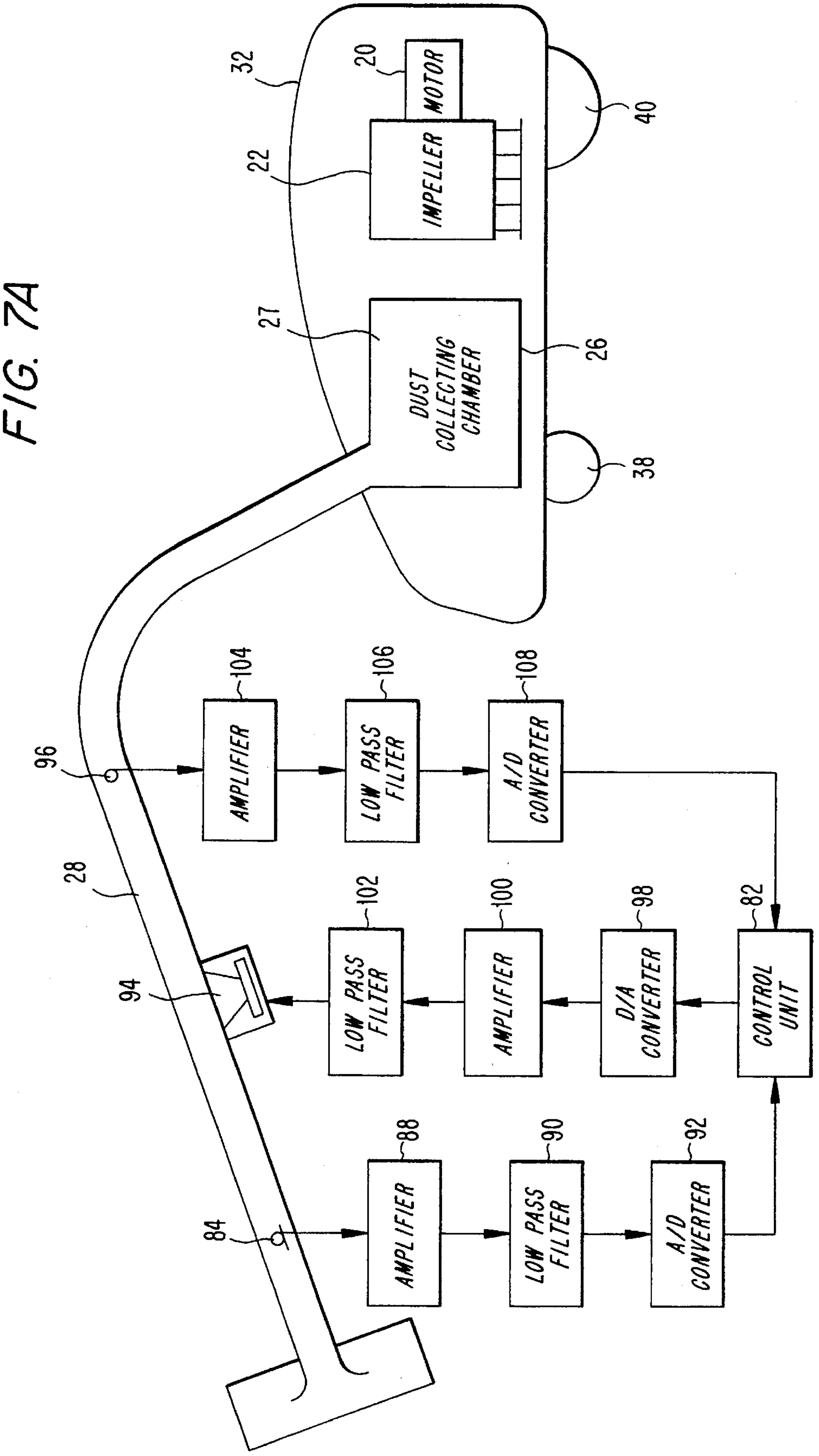
FIG. 7A is a schematic view of a noise control apparatus for a vacuum cleaner in accordance with a fourth embodiment of the present invention.
Figure 7B:
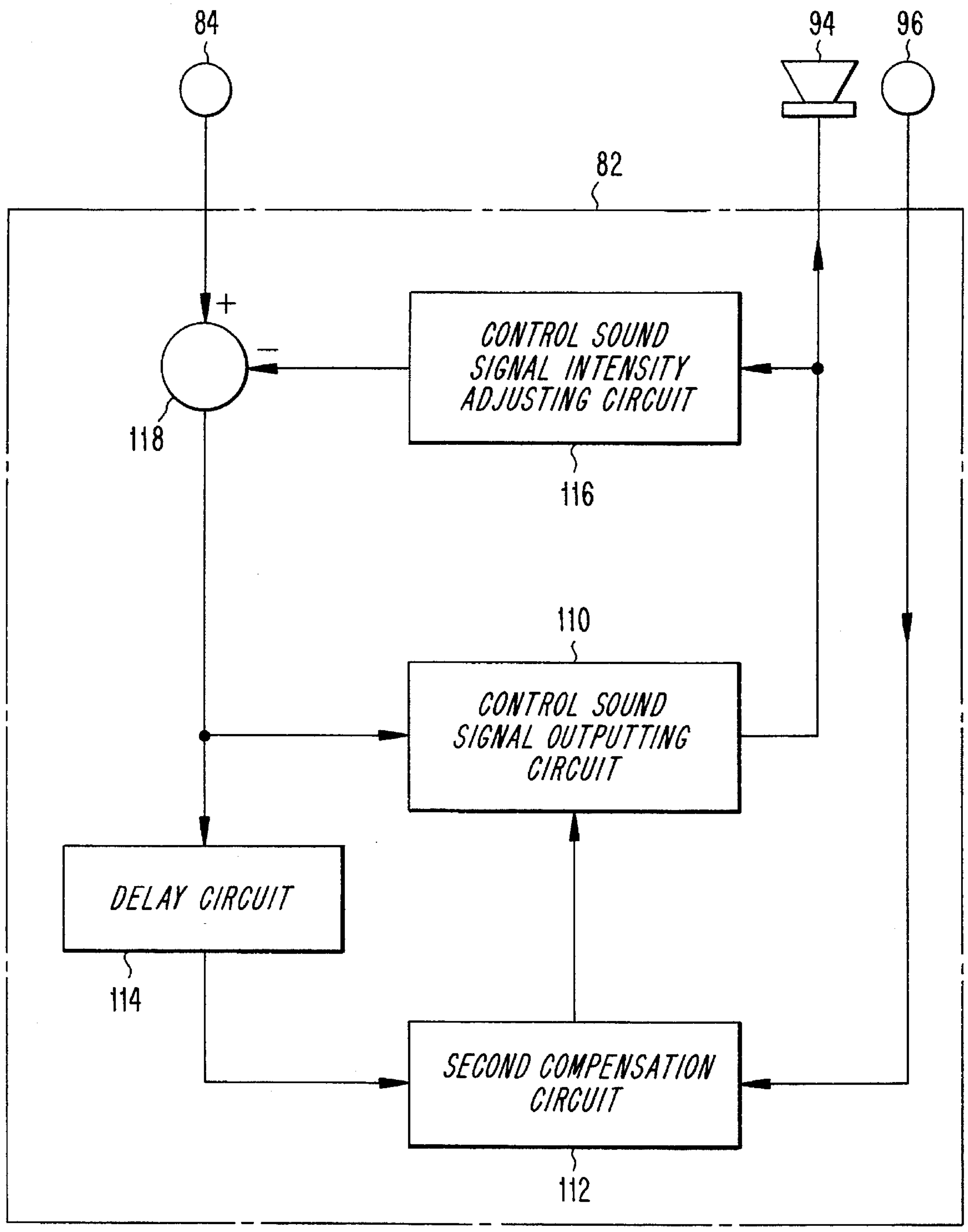
FIG. 7B is a block diagram of a control unit shown in FIG. 7A.

FIGS. 7A and 7B illustrate a noise control apparatus for a vacuum cleaner in accordance with a fourth embodiment of the present invention.

In FIGS. 7A and 7B, elements corresponding to those in FIGS. 1 to 4 illustrating the first embodiment of the present invention are denoted by the same reference numerals, and thus their description will be omitted.

In accordance with the fourth embodiment, the noise control apparatus includes a noise detecting unit 84 disposed in the suction pipe 28 and adapted to detect noise generated from the noise source and generate a noise level signal. A control unit 82 which will be described hereinafter receives the noise level signal.

Between the noise detecting unit 84 and the control unit 82, an amplifier 88, a low pass filter 90 and an analog/digital converter 92 are connected in series so as to convert the noise detected by the noise detecting unit 84 into an electrical signal. In the suction pipe 28, a control sound generating unit 94 is also disposed which receives a control signal from the control unit 82 and thereby generates a control sound for attenuating the noise generated from the noise source.

The noise control apparatus further includes an error sound detecting unit 96 disposed in the suction pipe 28 and adapted to detect an error sound resulting from the attenuation of the noise from the motor 20 and the impeller 22 by the control sound from the control sound generating unit 94. The error sound detecting unit 96 generates an error sound signal on the basis of the detection and sends it to the control unit 82.

Between the control sound generating unit 94 and the control unit 82, a digital/analog converter 98, an amplifier 100 and a low pass filter 102 are connected in series. The digital/analog converter 98 converts the control signal of the control unit 82 into an analog signal. The amplifier 100 serves to amplify the analog signal from the digital/analog converter 98 to a predetermined level. The low pass filter 102 permits the low frequency component of the amplified analog signal to pass through.

Similarly, an amplifier 104, a low pass filter 106 and an analog/digital converter 108 are connected in series between the error sound detecting unit 96 and the control unit 82. The amplifier 104 serves to amplify the error sound signal generated from the error sound detecting unit 96 to a predetermined level. The low pass filter 106 permits the low frequency component of the amplified error sound signal to pass therethrough. The analog/digital converter 108 converts the error sound signal output from the low pass filter 106 into a digital signal.

The control unit 82 is a microprocessor for controlling the overall operations of the noise control apparatus. As shown in FIG. 7B, the control unit 82 comprises a control sound signal outputting circuit 110 for receiving the noise signal from the noise detecting unit 84 and generating a control sound signal having the same amplitude and intensity as those of the noise signal and the opposite phase as that of the noise signal. The control sound signal from the control sound signal outputting circuit 110 is transmitted to the control sound generating unit 94. The control unit 82 further comprises a pair of compensation circuits, the first denoted by the reference numeral 118 and the second denoted by the reference numeral 112. The second compensation circuit 112 serves to generate a compensation signal for minimizing the intensity of the error sound. To generate such a compensation signal, the second compensation circuit 112 performs an operation based on the error sound signal generated from the error sound detecting unit 96 and the noise signal detected by the noise detecting unit 84. The compensation signal from the second compensation circuit 112 is sent to the control sound signal outputting circuit 110.

A delay circuit 114 coupled between the noise detecting unit 84 and the second compensation circuit 112. The delay circuit 114 delays the noise signal outputted from the noise detecting unit 84 for a predetermined time so as to synchronize the noise generated from the noise source and the control sound generated from the control sound generating unit 94 at the site of the error sound detecting unit 96. The delayed noise signal from the delay circuit 114 is sent to the second compensation circuit 112.

The control unit 82 further comprises a control sound signal intensity adjusting circuit 116 receives the control sound signal from the control sound signal outputting circuit 110 and adjusts the intensity of the received signal. The first compensation circuit 118 transmits only the noise generated from the noise source to the control sound signal outputting circuit 110 and the delay circuit 114. To this end, the first compensation circuit 118 subtracts the control sound signal generated from the control sound signal outputting circuit 110 as adjusted in intensity by the intensity adjusting circuit 116 from the noise signal detected by the noise detecting unit 84. The noise signal, compensated on the basis of the subtraction, is sent to both the control sound signal outputting circuit 110 and the delay circuit 114.

The suction pipe 28 has a trumpet-shaped inlet portion having a cross-section gradually increasing toward the inlet end thereof, as shown in FIG. 8. Such a trumpet-shaped suction pipe 28 allows the noise generated from the motor 20 and the impeller 22 to gradually dissipate, while the dust sucked from the floor flows toward the dust collecting chamber 27 more smoothly.

The cross-sectional area of the trumpet-shaped inlet portion of the suction pipe 86 can be expressed by the following equation:

$$S=So*e*m*x$$

where "So" is the cross-sectional area of the neck of the inlet portion, "m" is a constant indicative of the divergence of the trumpet shape, "x" is the distance from the neck to the inlet end, and "e" the base of the natural logarithm.

As shown in FIGS. 8 and 9, the noise detecting unit 84 and the error sound detecting unit 96 are disposed in sealed boxes 120 and 122, respectively. Boxes 120 and 122 are disposed in a dust sucking path defined in the suction tube 28. In the boxes 120 and 122, sound-absorbing members 124 and 126 are disposed beside the noise detecting unit 84 and the error sound detecting unit 96, respectively. A plurality of fine pores 128 are also provided at portions of the suction pipe 28 being in contact with the sound-absorbing members 124 and 126. Together with the fine pores 128, the sound-absorbing members 124 and 126 serve to absorb noise generated due to dust-carrying air being sucked into the suction pipe 28. By the provision of the sound-absorbing members 124 and 126 and the fine pores 128, the noise detecting unit 84 and the error sound detecting unit 96 can detect accurately the noise generated from the motor 20 and the impeller 22 and the error sound.

The operation and functional effect of the noise control apparatus of the fourth embodiment are similar to those of the first embodiment, and thus their description will be omitted.

Having described specific preferred embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

As apparent from the above description, the present invention provides a noise control apparatus for a vacuum cleaner, capable of effectively attenuating noise with a simple construction including a noise detecting unit, an error sound detecting unit and a control sound generating unit all being disposed in a cleaner body or a suction pipe.

Because the noise control apparatus of the present invention has a simple construction, it can be installed in any vacuum cleaner conveniently and simply.

In accordance with the present invention, a low pass filter may be coupled to each of the noise detecting units, the error sound detecting unit and the control sound generating unit. By the provision of such a low pass filter, it is possible to greatly attenuate noise having a frequency of 500 Hz or below.

What is claimed is:

1. A noise control apparatus for a vacuum cleaner, said noise control apparatus comprising:

control means for controlling operation of the noise control apparatus;

noise detecting means for detecting at least one characteristic of a noise generated from a noise source, generating a noise level signal on the basis of the noise detection, and sending the noise level signal to the control means;

control sound generating means for generating a control sound to attenuate the noise from the noise source based on a control sound signal output from the control means; and error sound detecting means for detecting an error sound resulting from the noise attenuation by the control sound from the control sound generating means, generating an error sound signal on the basis of the error sound detection, and sending the error sound signal to the control means wherein the control means comprises a control sound signal outputting circuit for receiving the noise level signal from the noise detecting means, generating a control sound signal having the same amplitude and intensity as the noise level signal and a phase opposite to that of the noise level signal, and sending the control sound signal to the control sound generating means;

a second compensation circuit for generating a compensation signal to minimize an intensity of an error sound, based on the error sound signal from the error sound detecting means and the noise level signal from the noise detecting means, and for sending the compensation signal to the control sound signal outputting circuit;

a delay circuit for delaying the noise level signal output from the noise detecting means such that the noise generated from the noise source is synchronized with the control sound generated from the control sound generating means at the site of the error sound detecting means, and sending the delayed noise level signal to the second compensation circuit;

a control sound signal intensity adjusting circuit for receiving the control sound signal from the control sound signal outputting circuit and for adjusting an intensity of the received control sound signal; and a first compensation circuit for subtracting the control sound signal generated from the control sound signal outputting circuit as adjusted in intensity by the intensity adjusting circuit from the noise level signal generated from the noise detecting means and for sending the noise level signal compensated on the basis of the subtraction to both the control sound signal outputting circuit and the delay circuit, whereby only the noise generated from the noise source is transmitted to the control sound signal outputting circuit and the delay circuit.

2. A noise control apparatus in accordance with claim 1, wherein the noise source comprises a dust-sucking motor located in the vacuum cleaner and an impeller driven by the dust-sucking motor.

3. A noise control apparatus in accordance with claim 1, wherein the noise detecting means is attached to a housing of a dust-sucking motor located in the vacuum cleaner so as to detect noise generated from the dust-sucking motor.

4. A noise control apparatus in accordance with claim 1, wherein the noise detecting means is in the vicinity of a dust-sucking motor located in the vacuum cleaner so as to detect noise generated from the dust-sucking motor.

5. A noise control apparatus in accordance with claim 1, wherein the noise detecting means is located in a suction pipe of the vacuum cleaner so as to detect noise generated from a dust-sucking motor located in the vacuum cleaner.

6. A noise control apparatus in accordance with claim 1, wherein the control sound generating means comprises a speaker located in the vicinity of an air filter of the vacuum cleaner, said speaker attenuating the noise being transmitted outwardly from the vacuum cleaner.

7. A noise control apparatus in accordance with claim 1, wherein the control sound generating means comprises a speaker located in a suction pipe of the vacuum cleaner, said speaker attenuating the noise generated from the noise source so as to prevent the noise from being transmitted outwardly from the suction pipe.

8. A noise control apparatus for a vacuum cleaner comprising:

control means for controlling operation of the noise control apparatus;

noise detecting means located in a suction pipe of the vacuum cleaner for detecting a noise generated from a noise source, generating a noise level signal on the basis of the noise detection and sending the noise level signal to the control means;

control sound generating means located in the suction pipe for generating a control sound to attenuate the noise from the noise source under control of the control means; and error sound detecting means located in the suction pipe for detecting an error sound resulting from the noise attenuation by the control sound from the control sound generating means, generating an error sound signal on the basis of the error sound detection and sending the error sound signal to the control means wherein the control means comprises a control sound signal outputting circuit for receiving the noise level signal from the noise detecting means, generating a control sound signal having the same amplitude and intensity as the noise level signal and a phase opposite to that of the noise level signal, and sending the control sound signal to the control sound generating means a second compensation circuit for generating a compensation signal to minimize an intensity of an error sound, based on the error sound signal from the error sound detecting means and the noise level signal from the noise detecting means, and for sending the compensation signal to the control sound signal outputting circuit;

a delay circuit for delaying the noise level signal output from the noise detecting means such that the noise generated from the noise source is synchronized with the control sound generated from the control sound generating means at the site of the error sound detecting means, and sending the delayed noise level signal to the second compensation circuit a control sound signal intensity adjusting circuit for receiving the control sound signal from the control sound signal outputting circuit and for adjusting an intensity of the received control sound signal; and a first compensation circuit for subtracting the control sound signal generated from the control sound signal outputting circuit as adjusted in intensity by the intensity adjusting circuit from the noise level signal generated from the noise detecting means and sending the noise level signal compensated on the basis of the subtraction to both the control sound signal outputting circuit and the delay circuit, whereby only the noise generated from the noise source is transmitted to the control sound signal outputting circuit and the delay circuit.

9. A noise control apparatus in accordance with claim 8, wherein the noise detecting means is connected to the control means via an amplifier, a low pass filter and an analog/digital converter, whereby the noise detected by the noise detecting means is converted into an electrical signal.

10. A noise control apparatus in accordance with claim 8, wherein the control sound generating means is connected to the control means via a digital/analog converter for converting the control signal of the control means into an analog signal, an amplifier for amplifying the analog signal from the digital/analog converter and a low pass filter for permitting a low frequency component of the amplified analog signal to pass therethrough.

11. A noise control apparatus in accordance with claim 8, wherein the error sound detecting means is connected to the control means via an amplifier for amplifying the error sound signal generated from the error sound detecting means to a predetermined level, a low pass filter for permitting a low frequency component of the amplified error sound signal to pass therethrough and an analog/digital converter for converting the error sound signal outputted from the low pass filter into a digital signal.

12. A noise control apparatus in accordance with claim 8, wherein the suction pipe has a trumpet-shaped inlet portion having a cross-section gradually increasing toward an outer end thereof such that said suction pipe allows the noise generated from the noise source to gradually dissipate and dust sucked into said suction pipe flows smoothly toward a dust collecting chamber in the vacuum cleaner.

13. A noise control apparatus in accordance with claim 8, wherein the noise detecting means and the error sound detecting means reside in sealed boxes located in a dust sucking path defined in the suction pipe, a pair of sound-absorbing members are located in the sealed boxes beside the noise detecting means and the error sound detecting means and a plurality of fine pores are provided at portions of the suction pipe being in contact with the sound-absorbing members, the sound-absorbing members together with the fine pores serving to absorb noise generated due to dust-carrying air being sucked into the suction pipe, thereby enabling the noise detecting means and the error sound detecting means to detect accurately the noise generated from the noise source and the error sound, respectively.

14. A noise control apparatus for a vacuum cleaner comprising:

control means for controlling operation of the noise control apparatus;

noise detecting means for detecting at least one characteristic of a noise, generating a noise level signal on the basis of the noise detection, and sending the noise level signal to the control means;

control sound generating means for generating a control sound to attenuate the noise based on a control sound signal output from the control means; and error sound detecting means for detecting an error sound resulting from the noise attenuation by the control sound, generating an error sound signal on the basis of the error sound detection, and sending the error sound signal to the control means, wherein said control means produces said control signal on the basis of said noise level signal and said error sound signal, wherein the control means comprises a control sound signal outputting circuit for receiving the noise level signal from the noise detecting means, generating a control sound signal having the same amplitude and intensity as the noise level signal and a phase opposite to that of the noise level signal, and sending the control sound signal to the control sound generating means;

a second compensation circuit for generating a compensation signal to minimize an intensity of an error sound, based on the error sound signal from the error sound detecting means and the noise level signal from the noise detecting means, and sending the compensation signal to the control sound signal outputting circuit;

a delay circuit for delaying the noise level signal output from the noise detecting means such that the noise is synchronized with the control sound generated from the control sound generating means at the site of the error sound detecting means, and sending the delayed noise level signal to the second compensation circuit;

a control sound signal intensity adjusting circuit for receiving the control sound signal from the control sound signal outputting circuit and for adjusting an intensity of the received control sound signal; and a first compensation circuit for subtracting the control sound signal generated from the control sound signal outputting circuit as adjusted in intensity by the intensity adjusting circuit from the noise level signal generated from the noise detecting means and sending the noise level signal compensated on the basis of the subtraction to both the control sound signal outputting circuit and the delay circuit, whereby only the noise is transmitted to the control sound signal outputting circuit and the delay circuit.

15. The noise control apparatus of claim 14, wherein said at least one characteristic of a noise includes a frequency of the noise.

16. The noise control apparatus of claim 14, wherein said at least one characteristic of a noise includes an amplitude of the noise.

17. A method for attenuating noise of a vacuum cleaner comprising the steps of:

detecting at least one characteristic of a noise generated by the vacuum cleaner;

generating a noise control signal based on the noise detection;

generating a control sound based on the noise control signal to attenuate the noise from the vacuum cleaner;

detecting an error sound resulting from the noise attenuation by the control sound;

generating an error sound signal based on the detected error sound;

generating a compensation signal to minimize an error sound based on the noise control signal and the error sound signal; and generating an adjusted control signal based on the compensation signal.

18. The method of claim 17, wherein said at least one characteristic of a noise includes a frequency of the noise.

19. The method of claim 17, wherein said at least one characteristic of a noise includes an amplitude of the noise.

20. A noise control apparatus for a vacuum cleaner comprising:

control means for controlling operation of the noise control apparatus;

noise detecting means located in a suction pipe of the vacuum cleaner for detecting a noise generated from a noise source, generating a noise level signal on the basis of the noise detection, and sending the noise level signal to the control means;

control sound generating means located in the suction pipe for generating a control sound to attenuate the noise from the noise source under control of the control means; and error sound detecting means located in the suction pipe for detecting an error sound resulting from the noise attenuation by the control sound from the control sound generating means, generating an error sound signal on the basis of the error sound detection and sending the error sound signal to the control means;

wherein the noise detecting means and the error sound detecting means reside in sealed boxes located in a dust sucking path defined in the suction pipe, a pair of sound-absorbing members are located in the sealed boxes beside the noise detecting means and the error sound detecting means; and a plurality of fine pores are provided at portions of the suction pipe being in contact with the sound-absorbing members, the sound-absorbing members together with the fine pores serving to absorb noise generated due to dust-carrying air being sucked into the suction pipe, thereby enabling the noise detecting means and the error sound detecting means to detect accurately the noise generated from the noise source and the error sound, respectively.

* * * * *